Dec. 25, 1956 W. J. TAMMINGA 2,775,374
FLUID MILK DISPENSER
Filed Oct. 25, 1954. 4 Sheets-Sheet 3
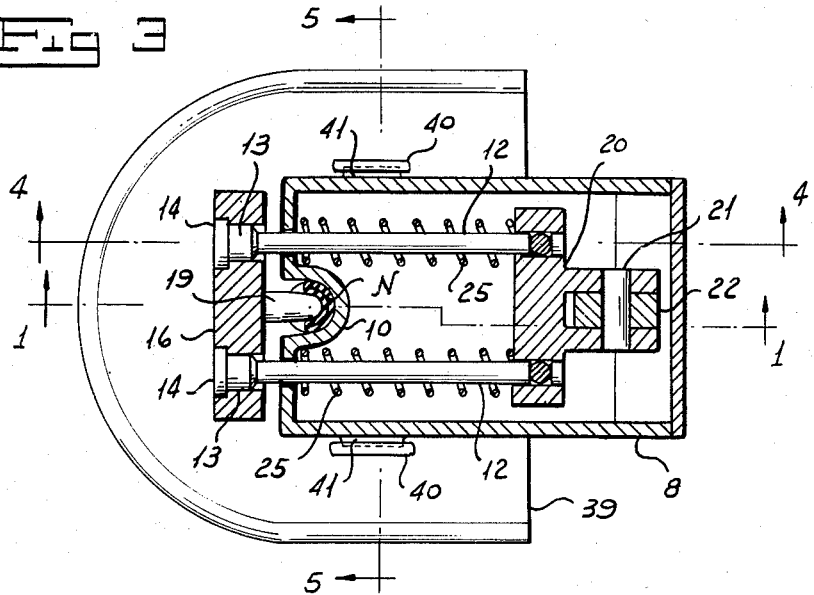
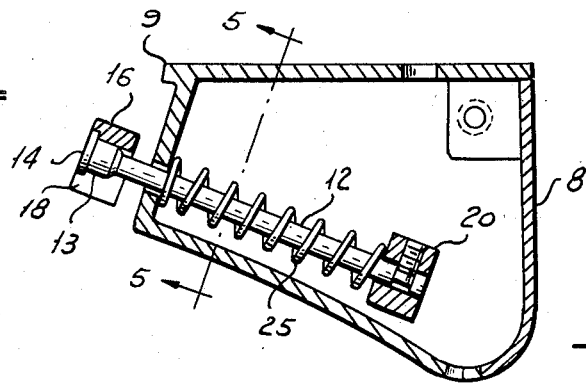
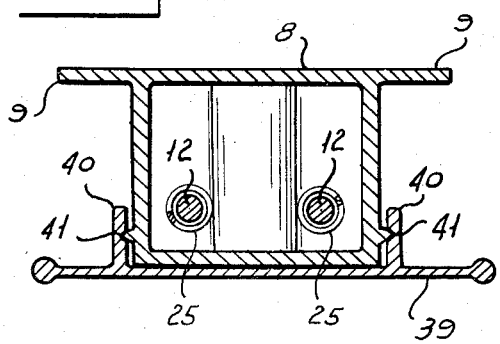
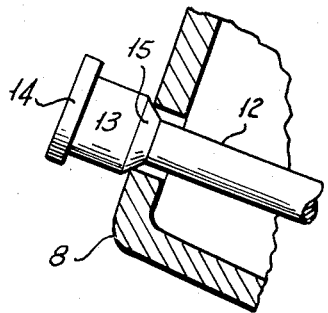
INVENTOR.
WILLIAM J. TAMMINGA
BY
ATTORNEY

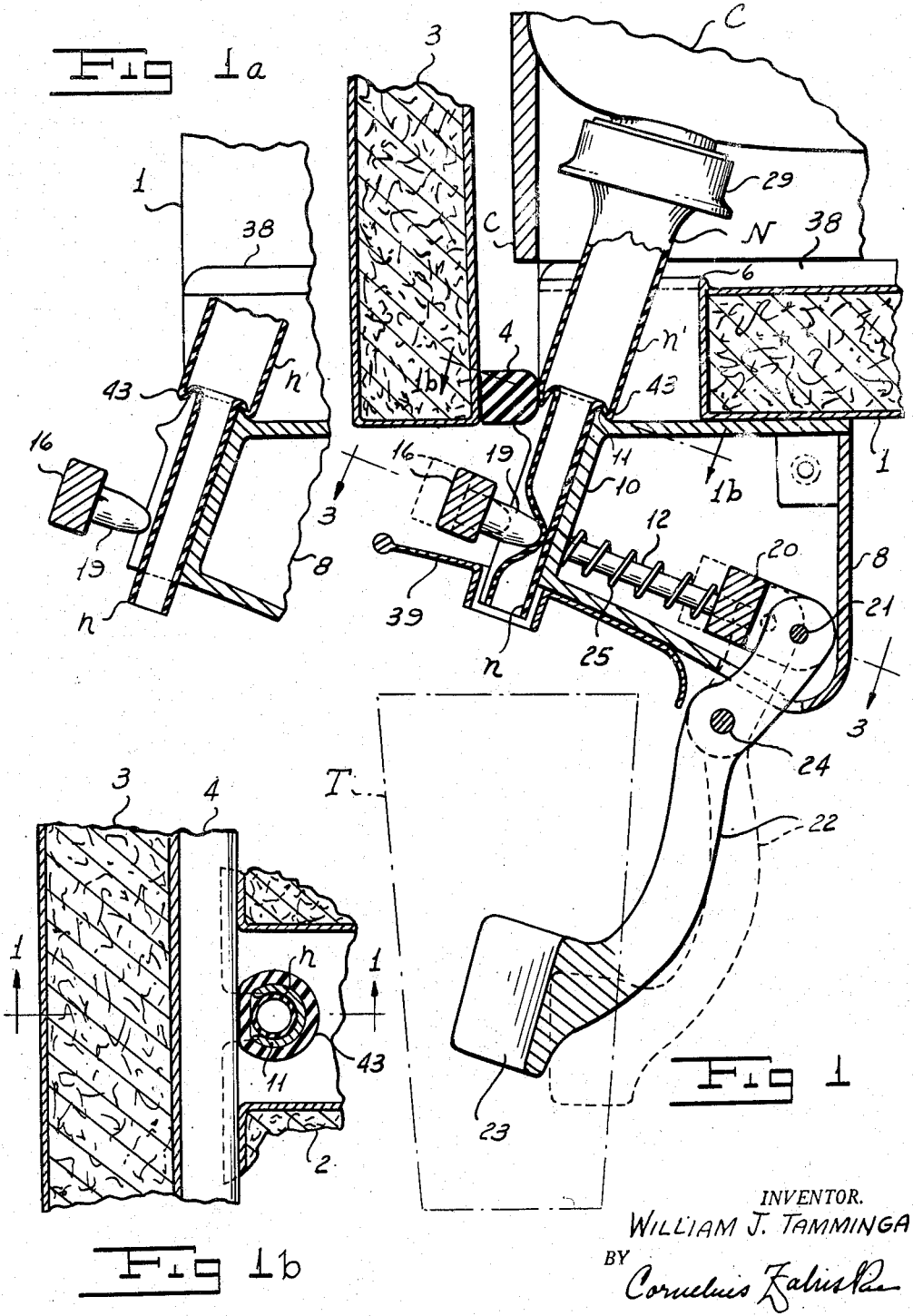

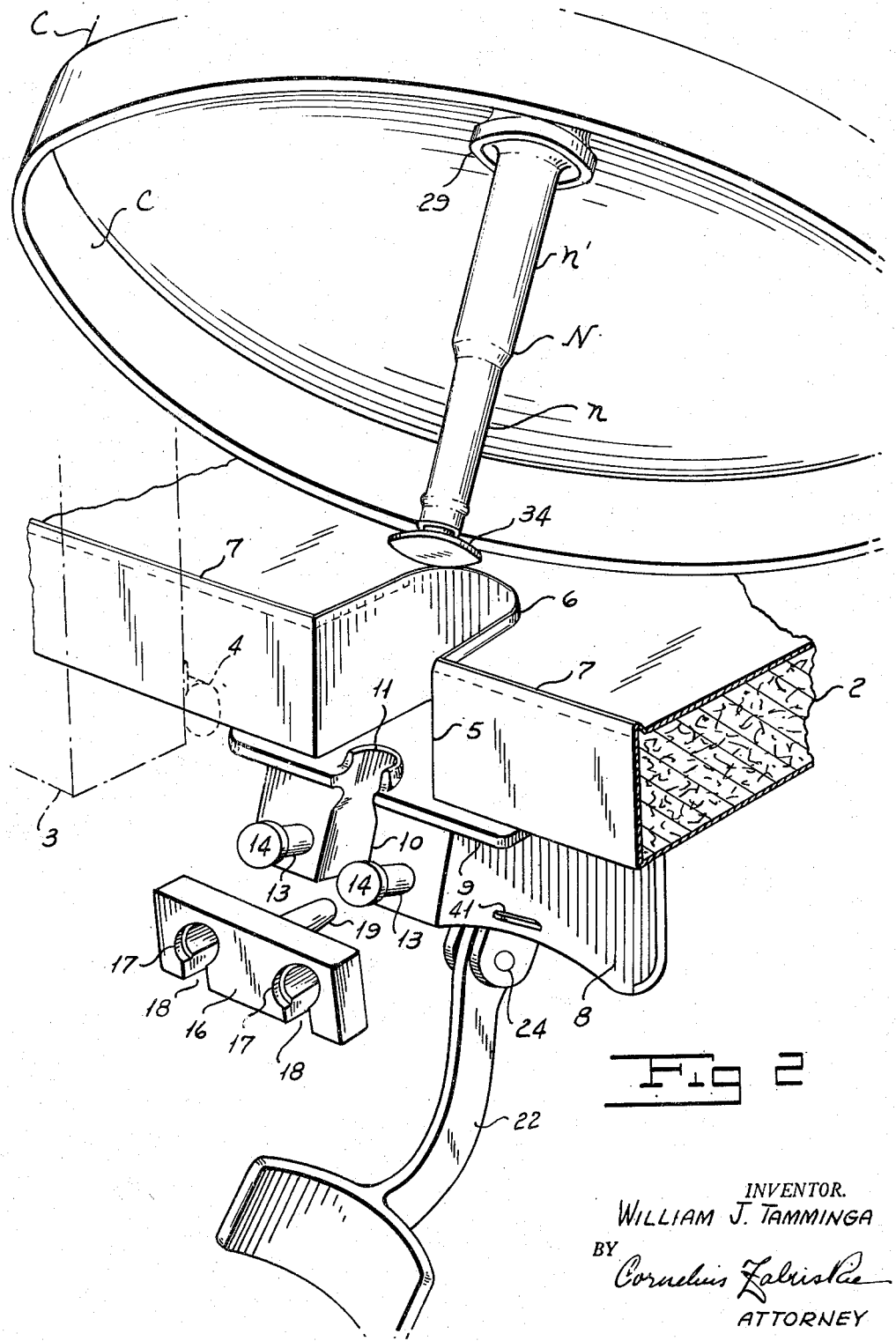

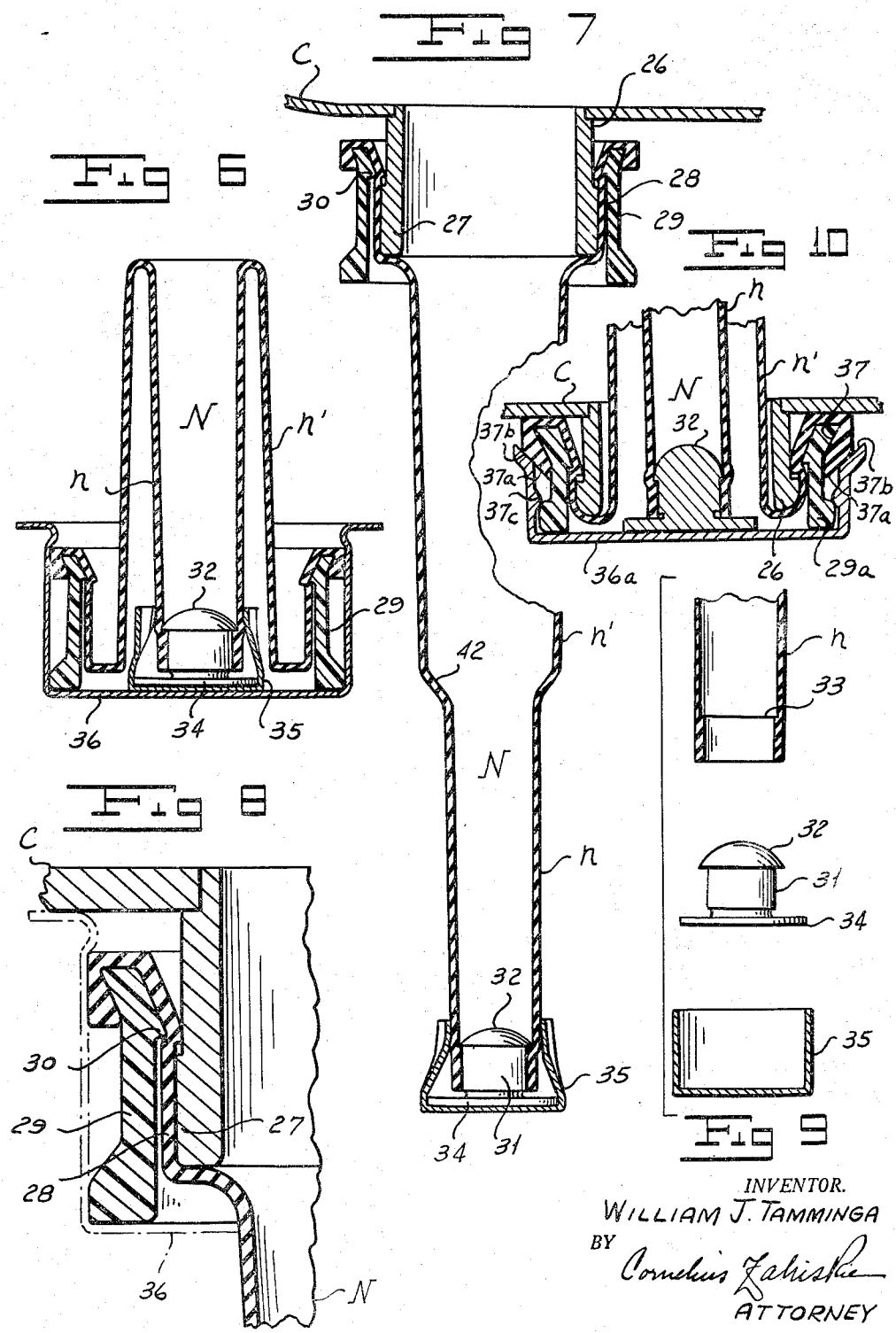

United States Patent Office 2,775,374
Patented Dec. 25, 1956

2,775,374

FLUID MILK DISPENSER

William J. Tamminga, Goshen, N. Y., assignor to Monitor Process Corporation, Jersey City, N. J., a corporation of New Jersey Application October 25, 1954, Serial No. 464,464

23 Claims. (Cl. 222—185)

This invention is a milk dispenser and is directed more particularly to that type of device wherein milk is adapted to be drawn from a conventional milk delivery can into tumblers, as customers in lunch rooms, restaurants, etc. may desire.

Generally speaking the dispenser of this invention comprises a refrigerated cabinet having an open front normally closed by a door. A conventional milk delivery can, positioned within the cabinet, is provided at its bottom with a milk outlet with which is associated a dispensing tube in the form of a flexible nipple adapted to project through the bottom of the cabinet and into cooperative relation with a control valve by means of which the flow of milk from the can may be controlled.

The invention embodies numerous novel features among which may be mentioned the following:

Of particular importance is the nipple through which the milk is dispensed. This nipple is of novel and unique construction and it is associated with the can in an entirely novel manner which permits the nipple, during shipment of the can from the creamery to the ultimate user, to be housed within the confines of the can and externally protected by a hood which maintains it in absolutely clean and sanitary condition. When the can reaches the ultimate consumer and is placed within the cabinet, the protective hood is removed and the nipple may be withdrawn and placed in cooperative relation with the control valve in a thoroughly convenient, simple and efficient manner.

Another feature of the invention consists in the manner of initially closing or sealing the outlet end of the nipple through the employment of a plug which may be withdrawn after the nipple has been placed in cooperative relation with the control valve, in order to open up that end of the nipple to permit the discharge of milk therethrough. With this plug a cap is preferably provided which protects the end of the nipple from contact with the hands of the operator, so that the nipple may not be contaminated by contact therewith.

Another feature of the invention consists in the novel and efficient manner of providing a seal between the door and that portion of the cabinet through which the nipple extends, to preclude the entrance of warm air into the cabinet and interfere with proper refrigeration of the can in the cabinet. The sealing of the cabinet at this point has heretofore constituted a troublesome problem which the present invention entirely overcomes in a simple and efficient manner.

Another feature of the invention consists in the provision of a discharge unit embodying a nipple and an enclosing hood and associated parts, all of which may be assembled to form a complete unit and thereafter simply pressed into cooperative relation with an outlet on the can to equip the can for milk delivery in accordance with the present invention.

Another feature of the invention is inherent in the fact that the nipple and all parts of the construction which come into contact with the milk may be sterilized in place on the can.

Another feature of the invention consists in the novel control valve mechanism operable by engagement with the hand of the operator or pressing a tumbler against the same to permit the flow of milk from the can into the tumbler.

Another feature of the invention consists in the formation of the various parts in such manner that any condensate which may form in the cabinet or above the dispensing mechanism may be led off so that it cannot fall into a tumbler into which the milk is being dispensed.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Fig. 1 is a fragmental section of mechanism embodying the present invention, this section being taken in the plane of the line 1—1 of Fig. 1b. In this figure the parts are shown with the cabinet door closed.

Fig. 1a is a fragmental section corresponding to Fig. 1, but showing the shape of the nipple with the door open.

Fig. 1b is a section on the line 1b—1b of Fig. 1.

Fig. 2 is a fragmental section showing a portion of the floor of the cabinet with the control valve mechanism and also showing a can up-tilted so that the under side of the can may be seen with the dispensing nipple attached thereto and withdrawn for cooperation with the control valve mechanism.

Fig. 3 is a section on the line 3—3 of Fig. 1.

Fig. 4 is a section on the line 4—4 of Fig. 3.

Fig. 4a is a section corresponding to Fig. 4, but showing the manner in which one of the spring actuated rods of Fig. 4 serves to form a seal against the entrance of condensation or moisture into the housing of the valve mechanism.

Fig. 5 is a section taken on the line 5—5 of Fig. 3 and the line 5—5 of Fig. 4.

Fig. 6 shows a nipple and seal unit assembled and ready to be placed upon the outlet of a can.

Fig. 7 shows a nipple in place on the can and withdrawn from the interior of the can.

Fig. 8 is an enlarged fragmental section showing the manner in which the nipple is locked to the can so that it cannot pull off.

Fig. 9 is an exploded view of the lower end of the nipple, the plug that seals said lower end, and a protective cap that covers the plug and protects the lower end of the nipple from contact with the hands of the operator.

Fig. 10 shows a modified form of unit in place on the can outlet and with the greater portion of the nipple housed within the can, as when the can is ready for shipment from the creamery.

The cabinet of this invention is of the same general type disclosed in my prior Patent No. 2,186,083. It comprises a bottom wall 2, side and back walls not shown, and an open front adapted to be closed by a door 3 which is hinged at one side. The gasket 4 is secured around the margin of the inner surface of the door and serves to produce a satisfactorily tight seal so that hot air cannot enter from the outside into the cabinet which is generally refrigerated. The walls of the cabinet may be constructed in any suitable way, but an approved form comprises hollow metal walls and door with insulated packing as shown. The cabinet itself forms no part of the present invention except insofar as it is modified to meet the requirements of this invention. These requirements are satisfied by forming in the front edge of the floor 2 a niche 5 which is open to the front edge of the floor and around this niche is provided an upstanding rib or flange 6 which is extended, as indicated at 7, along the front edge of the floor, so that any condensate that may form in the cabinet will not flow downwardly through the niche 5. Beneath the floor 2 is a valve mechanism comprising a casting 8 which constitutes a hollow housing secured to the underside of the floor by screws or mounted in place by any other appropriate manner.

At the top of the housing is formed a substantially horizontal flange 9 which projects slightly beyond the forward edge of the floor, as shown best in Fig. 2, and in the front of the housing and extending through said flange is an inclined seat 10 in the form of a substantially semi-circular channel located directly below the niche 5. The extent of this channel may be a little greater than the semi-circle, but in any event it is open at its top and bottom and at its front, so that a piece of tubing may be entered into the channel to seat therein through the front opening thus provided. Around the upper end of the channel seat is formed a raised flange 11 which serves to preclude the entry of condensate into said channel.

The front wall of the housing 8 is provided at each side of the seat 10 with holes through which project rods 12. These rods are provided at their forward ends with cylindrical portions 13 beyond which the rods are headed at 14. The cylindrical portion 13 of each rod terminates in a frusto conical portion 15 which, when engaged with the margin of the hole through which it passes, as indicated in Fig. 4a, functions like a valve, so that no liquid can enter through the hole into the housing 8.

A clamping head 16 is adapted to be detachably associated with the twin rods 12. This clamping head is shown in perspective in Fig. 2 and in section in Figs. 3 and 4. It is provided with holes 17 of such size and so spaced apart that these holes are adapted to receive the heads 14 of the rods and back of these holes the head is counterbored to receive the cylindrical portions 13 of said rods. Slots 18 are formed in the underside of the clamping head, so that, when the rods 12 are pulled forwardly, the head may be slipped over the rods and, when the clamping head is drawn forwardly, the cylindrical portions 13 of the rods and the heads 14 of the rods will seat in the openings of the clamping head and lock said clamping head on the rods 12. Mounted on the back face of the clamping head is a finger 19, which, through the operation of the rods, is adapted to be moved into and out of the channel-like seat 10 of the housing for the purpose of flattening a collapsible tube projecting through said seat after the manner of a pinch-valve or permitting it to assume circular conformation, as hereinafter more fully described.

The rods 12 extend backwardly into the interior of the housing 8 and are secured at their rear ends to the yoke 20 which is attached by a pin 21 to an operating lever 22, as shown best in Fig. 1. This lever extends downwardly through the bottom of the housing 8 and is provided at its lower end with an integral operating plate 23 shaped to be engaged by a tumbler positioned beneath the lower end of the channel seat 10. The lever is pivoted at 24 on lugs depending from the housing as shown in Fig. 2. A spring 25 embraces each of the rods 12 between the front wall of the housing and the yoke 20 and normally tends to move the operating lever 22 into the full line position of Fig. 1 and the finger 19 into the seat 10 to collapse a rubber or plastic tube extending through said seat and thus seal the tube at this point. However, if a tumbler is pressed against the plate 23, the operating lever 22 will be retracted into its dotted line position shown in Fig. 1, and the finger 19 similarly retracted into the dotted line position of the same figure to permit the flow of liquid through the tube.

Tubes for the dispensing of liquid have heretofore been used in the milk dispensing art, but in contradistinction to the usual tube of prior practice, I employ a very special kind of flexible nipple N. This nipple may be made of rubber of plastic material, but it must be flexible, so that it may be mounted and manipulated in a manner next to be described.

The can C, according to this invention, is an ordinary milk delivery can of the conventional 20 or 40 quart variety modified to the extent that it is provided near one side of its bottom with an opening to which is affixed a tubular outlet 26. This outlet is positioned fairly close to the usual reinforcing ring c with which these cans are generally provided. The tubular outlet has an external bead 27 as shown in Fig. 7.

The nipple N is made of rubber or any appropriate plastic material and is of generally tapering form. The taper may be uniform throughout the greater portion of the length of the nipple, but the nipple is provided at one end with an enlarged portion 28 adapted to fit over the tubular outlet 26 of the can, as shown in Fig. 7, and it is held in place against inadvertent removal by a sleeve 29 which may conveniently be of plastic material. This sleeve is provided near its upper, larger end with an internal offset or flange 30 adapted to force the nipple into tight engagement with the tubular outlet 26 above the bead 27 of the latter, clearly shown in Fig. 7, so that the nipple cannot be inadvertently removed from the tubular outlet. The upper end of the nipple is turned back over the upper end of the sleeve 29 as shown.

The smaller end of the nipple is adapted to be closed by a plug 31 having an enlarged head 32 (see Fig. 9). The lower edge of this enlarged head is made fairly sharp, so that, when the plug is pushed into the end of the nipple, as in Fig. 7, this lower edge will pass beyond a seat 33 formed interiorly of the nipple, as clearly shown in Fig. 10, and will tend to externally slightly bulge the nipple at this seat, so that the plug cannot be inadvertently dislodged. However, the plug is provided with a finger piece 34 by means of which it may be grasped and withdrawn when it is desired to unseal the end of the nipple because the natural flexibility and elasticity of the nipple will permit of such withdrawal when sufficient tension is applied. In practice, I prefer to cover the lower end of the nipple and the finger piece 34 with a cap 35 of wax paper or metal foil which may be gathered in closely around the nipple after the plug has been inserted. This cap permits the plug to be withdrawn without bringing the hands of the operator into contact with the ends of the nipple through which the milk is to be dispensed. The plug may be removed by grasping the finger piece of the plug with the cap in place and pulling the plug and cap from the nipple together.

It is the practice to apply the nipple at the creamery before filling a can C with milk and I prefer to form the nipple as a apart of an assembled unit which may be easily picked up by a creamery operator and slipped onto a can complete. Such a unit is shown in Fig. 6. Here substantially one-half the length $n$ of the nipple N is telescoped within the remaining half $n'$ with the plug and the cap 35 in place and with the sleeve 29 embracing the turned up end of the nipple as shown. A protective hood 36 of metal, paper or plastic embraces the assembly as shown and fits tightly about the upper margin of the nipple. With this arrangement it is possible to pick up the structure of Fig. 6 as a unit and force it over the lower end of the tubular outlet 26 on the can in order to mount the nipple thereon prior to filling the milk or even prior to sterilizing the can, if so desired. It will thus appear that the nipple may be sterilized in place on the can. This is a desirable feature of this invention. A can, with the unit of Fig. 6 attached, is adapted to be filled and shipped in this condition to the restaurant, lunch room or the like for use in the manner presently described.

In Fig. 6, one type of unit is shown. In Fig. 10 a somewhat different modified form of unit is illustrated. Here the sleeve 29a, which corresponds to the sleeve 29, is provided adjacent its upper edge with an external frusto conical portion 37 and the end portion of the nipple is also provided with a frusto conical tapering surface 37a. The protective hood 36a, which corresponds to the hood 36, is provided with a frusto conical surface 37b adapted to cooperate with the surface 37a and is also formed with an internal bead 37c adapted to cooperate with an external bead at the lower end of the locking sleeve. The parts are so proportioned that, when the dust hood is forced into place, the bead 37c will fit tightly over the bead of the locking sleeve, while the surface 37b will bear firmly against the surface 37a of the nipple. At the same time the portion of the nipple which passes over the upper end of the locking sleeve will bear against the bottom of the can, as clearly shown in Fig. 10, and provide a seal at this point which will exclude water, dirt or other foreign matter.

A filled can equipment with an assembly, such as shown in Fig. 6, and with the nipple housed within the can and thoroughly protected by the protective hood 36, is delivered to the retail dispenser of milk. Before removing the hood 36, he places the can in the cabinet, so that it rests upon the usual can slides or guides 38 on the floor of the cabinet. To do this he must open the door of the cabinet and, while the door is open, he reaches in under the ring c of the can and rips off the protective hood 36. He then grasps the finger piece 34 of the plug with protective cap 35 thereon and pulls downwardly and by so doing withdraws the nipple into the position shown in Fig. 7. He then presses the operating lever 22 rearwardly into the dotted line position and while in this position he shifts the clamping head rearwardly and removes it, as shown in Fig. 2, so that nothing will be in the way or hinder the placing of the nipple in its seat. He then passes the lower portion n of the nipple, by a sidewise movement, through the open front of the channel-like seat 10 into said slot. These operations are easily and conveniently performed because there is nothing in the way to hinder this operation. The entire operation is done in the open and with plenty of clearance for his hands so that he has no difficulty in placing the lower portion of the nipple in its inclined seat 10. This freedom of operation and the ease with which the nipple is associated with the valve mechanism, is peculiar to the present construction because it has heretofore been necessary in practically all commercial constructions where flexible outlets are used, to thread the outlet or tube, as the case may be, through a passage by longitudinally introducing it and passing it through such passage. Nothing of the kind is necessary here.

After the nipple has been seated in the channel 10, the operating lever is again pressed back and the clamping head attached to the forward ends of the rods 12, as hereinbefore described, and immediately the springs 25 will draw the finger 19 into engagement with the nipple to seal the nipple at this point. The plug 31 may then be pulled out and the parts are ready for milk dispensing operation.

If a tumbler T is now placed against the plate 23 of the lever 22 and caused to force it back into dotted line position of Fig. 1, the finger 19 will be withdrawn and milk will flow into the tumbler until it is full, at which time the operator, by the act of removing the tumbler, will permit the springs 25 to shut off the flow of milk.

During the dispensing of milk, there is always the tendency of the milk to splash. To protect the mechanism from this splashing, I preferably provide a splash shield 39. This splash shield underlies the housing 8, as shown in Figs. 1, 3 and 5 and it is provided with upstanding lugs 40 adapted to cooperate with beads 41 on the housing, see Figs. 3 and 5, to hold it in place. The splash shield is of relatively light metal or plastic, so that the lugs will resiliently engage the beads 41 on the housing and permit the removal of this shield when desired for cleaning purposes.

As hereinbefore stated, the nipple may have a uniform taper or it may have an offset as shown. However, I prefer to provide the offset, as indicated at 42 in Fig. 7. When this arrangement is employed, that portion n' above the offset, is preferably made of somewhat greater length than the distance between the end of the can outlet and the flange 11 of the housing 8, so that when the parts are assembled, the upper portion n' of the nipple will droop somewhat, as indicated at 43 in Fig. 1a, over the flange 11 and this drooping portion will project somewhat beyond the front edge of the bottom wall 2 of the cabinet. With this arrangement, the closing of the door 3 will cause the gasket 4 to come against the flatten out the drooping portion 43, as shown in Figs. 1 and 1b, and thus form an effective seal against the loss of refrigeration. In the event that a uniformly tapered nipple is used, the channel 10 may be formed a little closer to the front edge of the floor 2, so that the closing of the door will cause the gasket 4 to engage directly with the tapering wall of the nipple and produce the seal desired without materially lessening the capacity of the flow of milk through the tube.

When all the milk has been dispensed from the can, the door of the cabinet is opened, the operating lever pushed back, the clamping head removed and the empty can lifted out of the cabinet for return to the creamery and a filled can is substituted in its place by following the procedures heretofore described. When the empty can reaches the creamery, the nipple N and sleeve 29 can be easily stripped from the can outlet by a tool similar to a pinch bar with a claw at one end to straddle the can outlet between the can bottom and the sleeve and then by a prying operation the sleeve and nipple will be removed. This act of removal may cut or damage the nipple, but this is inconsequential as the nipple is of the single use variety and should be discarded after one use.

It will be apparent from the foregoing detailed description that this invention embodies a marked departure over prior practice. It provides for the most sanitary dispensing of milk and for the most convenient manner of associating a flexible outlet with a valve controlled mechanism. It is the simplest and most convenient arrangement ever produced in this art for the type of dispensing herein under consideration.

The foregoing detailed description sets forth the invention in its preferred practical forms, but the invention is to be understood as fully commensurate with the appended claims.

Having thus fully described the invention, what I claim as new and desire to secure by Letters Patent is:

1. A milk dispenser comprising: an open-front cabinet having a floor provided in its front edge with a niche, and an open-front channel extending downwardly below the niche whereby a flexible conduit may be passed from the interior of the cabinet downwardly through the niche and through the channel and seat within said channel, in combination with a conduit collapsing member forwardly of the channel and operable against the conduit in the direction of the forwardly facing front surface of the channel to collapse the conduit against the flow of milk therethrough, and means for moving the conduit collapsing member into and out of engagement with the conduit.

2. A milk dispenser according to claim 1, wherein the conduit collapsing member is displaceable from in front of the channel to permit the conduit to be placed in the channel by movement in a direction normal to the axis of the channel.

3. A milk dispenser according to claim 2, wherein the conduit collapsing member is demountable from the channel.

4. A milk dispenser according to claim 1, wherein the front of the channel is open at all times.

5. A milk dispenser according to claim 1, comprising: spring means for normally forcing the conduit collapsing member into engagement with the conduit, and manually operable means for retracting said member against the action of the spring means.

6. A milk dispenser according to claim 1, wherein the channel is tilted in a downwardly and forwardly direction.

7. A milk dispenser according to claim 1, comprising: a plate rigid with the channel and secured to the under side of the cabinet floor to seal the bottom of the niche except at the channel, the front edge of said plate being substantially in the plane of the front edge of the cabinet, a door for closing the open front of the cabinet, and a gasket interposed between the door and said front edge of the cabinet and between the door and the front edge of said plate to seal the cabinet except at the channel, said channel being sufficiently close to the front edge of the cabinet that said gasket will engage with the tubular conduit to form a seal therewith.

8. A milk dispenser according to claim 7, wherein the plate is provided around the margin of the channel with an upstanding flange to preclude the flow of condensate into the channel.

9. A milk dispenser according to claim 8, wherein the floor of the cabinet is provided around the margin of the niche with an upstanding flange to preclude the flow of condensate from the cabinet floor into the niche.

10. A milk dispenser comprising: an open-front cabinet having a floor provided in its front edge with a niche and an upstanding flange extending along the front margin of the floor and around the margin of the niche to preclude the flow of condensate from the floor of the cabinet through the niche.

11. A milk dispenser according to claim 10, comprising: a valve mechanism positioned on the under side of the cabinet below the niche and having a channel through which a tubular conduit extending downwardly from the interior of the cabinet through the niche may seat, said channel being rigid with a plate secured to the bottom of the floor of the cabinet to close said niche except at the channel, and a flange formed on the plate about the margin of the channel to preclude the flow of condensate from the surface of said plate into the channel.

12. A milk dispenser comprising: a cabinet provided with an opening in its floor, an open-front channel extending downwardly below the opening and into which a flexible conduit extending downwardly through the opening in the cabinet is adapted to lie, and a pinch valve member operable through the open front of said channel against said conduit to collapse the conduit for the purpose of shutting off the flow of liquid therethrough, and means for moving said pinch valve member into and out of engagement with the conduit.

13. A milk dispenser according to claim 12, wherein the pinch valve member is displaceable from in front of the channel to permit the flexible conduit to be placed in the channel by movement in a direction normal to the longitudinal axis of the channel.

14. A milk dispenser comprising: an open-front cabinet having a floor provided in its forward edge with a niche, a valve mechanism mounted at the under side of the cabinet comprising a housing provided in its forward face with an open front re-entrant channel positioned below and registering with the niche to permit a flexible conduit carried by a can in the cabinet to be drawn downwardly through the niche and then laid in the channel by movement of the conduit in a direction normal to the longitudinal axis of the channel, said valve mechanism including a pinch valve member operable through the open front of the channel to collapse the conduit within the channel for the purpose of precluding the flow of liquid therethrough, and means for moving said pinch valve member into and out of engagement with the conduit.

15. A milk dispenser comprising: an open-front cabinet having a floor provided in its forward edge with a niche, a valve mechanism mounted at the under side of the cabinet comprising a housing formed in the forward face with an open-front re-entrant inclined channel positioned below and registering with the niche to permit the passage of a flexible tubular conduit from the interior of the cabinet through the niche and through the channel to seat against the base of the latter, operating rods extending through the front wall of the housing at either side of the channel, a clamping head supported on the forward ends of said rods, a conduit collapsing member on the clamping head contiguous to the channel and intermediate the ends of the latter, springs co-acting with said rods to normally force the conduit collapsing member into engagement with the conduit to collapse the same against the passage of liquid therethrough, and a manually operable lever connected to the rods to retract said member against the tension of the springs to permit the flow of liquid through the conduit.

16. A milk dispenser comprising: an open-front cabinet with an opening in its bottom and adapted to contain a milk can having a flexible conduit projecting from the bottom of the can and through the opening in the bottom of the cabinet, a dispensing mechanism mounted at the under side of the cabinet and provided therein with a seat in which the downwardly extending portion of the conduit is adapted to rest, said seat being spaced from the front edge of the cabinet to cause a portion of the conduit to extend beyond the front edge of the cabinet, a door for closing the open front of the cabinet, and a gasket interposed between the door and the front edge of the cabinet and between the door and the conduit and engaging with and deforming the latter to seal the interior of the cabinet at this point.

17. A cabinet provided in its bottom with an opening, a can positioned within the cabinet and having at its bottom a flexible conduit extending downwardly through said opening, a valve mechanism positioned at the under side of the bottom of the cabinet and including a seat to receive the downwardly projecting portion of the flexible conduit, the front side of said seat being open and the upper end of said seat having an upstanding marginal flange, an intermediate portion of said conduit being circumferentially drooped over said flange.

18. A milk dispenser comprising: a cabinet provided with an opening in its floor, a pinch valve mechanim positioned beneath said opening and including a passage, a milk can positioned within the cabinet and having in its bottom wall an outlet including a flexible conduit extending downwardly through the opening in the bottom of the cabinet and through the passage of the pinch valve mechanism, said conduit having an offset adapted to seat upon the upper end of the margin of the passage.

19. An assembly comprising: a milk can provided at its bottom with a tubular outlet having an external bead, a flexible conduit one end of which embraces said outlet, and a tubular sleeve embracing both the outlet and the interposed portion of the conduit and having an internal bead clamping the wall of the conduit against the outlet between the bead of the latter and the bottom of the can.

20. An assembly according to claim 19, wherein the flexible conduit extends over the outer end of the tubular outlet and through said outlet into the confines of the can.

21. An assembly according to claim 20, comprising a hood closing the open end of the conduit and outlet and having a skirt detachably embracing the sleeve.

22. An assembly according to claim 19, wherein the inner end of the sleeve has a frusto conical portion over which the free end of the conduit is folded back to conform thereto.

23. An assembly according to claim 22, comprising a hood enclosing the conduit and having a frusto conical portion bearing against the frusto conical conforming portion of the conduit and provided with an internal boss also engaging with the conduit back of the boss of the tubular outlet.

References Cited in the file of this patent

UNITED STATES PATENTS

| | | |
|---|---|---|
| 2,377,261 | Norris | May 29, 1945 |
| 2,565,699 | Rieke | Aug. 28, 1951 |
| 2,601,319 | Norris et al. | June 24, 1952 |
| 2,661,128 | Rieke | Dec. 1, 1953 |